Dec. 16, 1969     H. A. CLAY     3,484,221

HIGH ENERGY FUEL AND METHOD FOR RECOVERING SAME

Filed May 2, 1966     2 Sheets-Sheet 1

INVENTOR
H. A. CLAY
BY
*Young & Quigg*
ATTORNEYS

United States Patent Office 3,484,221
Patented Dec. 16, 1969

3,484,221
HIGH ENERGY FUEL AND METHOD FOR RECOVERING SAME
Harris A. Clay, Bartlesville, Okla., assignor to Phillips Petroleum Company, a corporation of Delaware
Filed May 2, 1966, Ser. No. 546,726
Int. Cl. C10h 23/00
U.S. Cl. 48—197
13 Claims

ABSTRACT OF THE DISCLOSURE

A high energy acetylene containing fuel is produced by solvent extracting acetylene and diolefin components from a feed stream, and stripping the diolefin from said acetylene in two stages. Also the flame temperature of the produced acetylene containing fuel is controlled by adjusting the quantity of a gas introduced into one of the two stripping stages.

---

Figure 1:
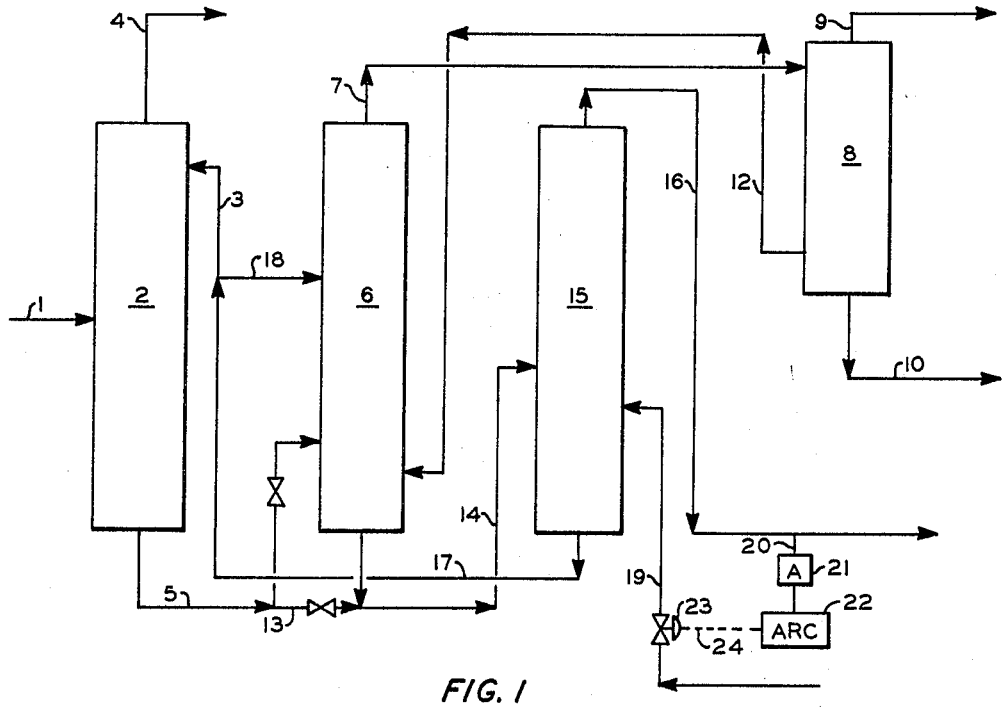

This invention relates to acetylenes-containing high energy fuel. In one of its aspects, the invention relates to the recovery of high energy acetylenes-containing fuel from a butenes- or pentenes-containing hydrocarbon stream by passing said hydrocarbon stream to an extractive distillation zone and therein contacting the stream to selectively remove acetylene compounds and diene compounds, removing the rich solvent to a stripping zone and therein at least partially stripping these compounds as gaseous products from the solvent in the presence of added lean solvent, removing lean solvent from the stripping zone and passing a portion thereof to the stripping zone above the point of entry of the rich solvent, passing another portion of the lean solvent to the solvent extraction zone as a solvent therein, and removing alkyl acetylenes as a high energy stream from the stripping zone. In another aspect, the invention relates to a process as hereinbefore described wherein the stripping zone comprises a first stripping column and a second stripping column, the lean solvent is introduced into the first stripping column, diolefin compounds are removed as a gaseous component from the first stripping column, the partially stripped solvent is passed to the second stripping column wherein substantially all of the gases are stripped from the solvent and the high energy fuel is removed as a gaseous product from the second stripping column. In another of its aspects, the invention relates to a method as hereinbefore described wherein there is passed to at least one of the first and second stripping columns a stripping gas containing a combustible hydrocarbon component, and the high energy fuel is removed from at least one of the first and second stripping columns. In a still further aspect, the invention relates to a method as hereinbefore described wherein a propane-propylene containing feed is introduced into a second extractive distillation column, and at least a portion of the overhead from the second extractive distillation column is passed to the stripping zone and used as the stripping agent therein. In still another aspect, the invention relates to a cutting torch fuel produced by one of the aforementioned methods.

In recent years, the production of 1,3-butadiene has become increasingly important because of its use in the manufacture of synthetic rubber. Butadiene is prepared commercially by the dehydrogenation of butenes and from $C_4$'s produced in light olefin manufacture. The dehydrogenation products contain other hydrocarbons in addition to butadiene. Some of these additional hydrocarbons present in the butadiene adversely affect its subsequent use, particularly in the production of synthetic rubbers. Various methods and processes have been proposed for the segregation and purification of butadiene. Such methods and processes are generally designed for the complete removal of alkyl acetylenes, in particular vinyl acetylene, from the process streams. One such method uses an extractive distillation zone in which a solvent selectively dissolves butadiene and vinyl acetylene from the other gaseous components and uses a first stripping zone to remove butadiene from the rich solvent and a second stripping zone to remove the vinyl acetylene from the solvent. The lean absorbent from the second stripping zone is recycled to the absorption zone.

I have now discovered that this separation process can be improved with the production of a high energy fuel with the use of the lean absorbent in the first stripping zone.

The by-products from the diolefin separation processes are generally of little value. Recently, it has been discovered that alkyl acetylenes can be used in high energy industrial fuel gases. However, the alkyl acetylenes containing stream produced in the prior art separation processes are of such low calorific value as to be generally unuseful without further processing. Further, the heating value of the by-product acetylenes containing stream will vary considerably due to the varying composition of the feed stream and due to the desire to obtain a substantially pure butadienes product. I have now devised a method by which the by-product acetylenes containing stream can be upgraded for commercial utilization by employing a double stripping process and/or proper choice of a stripping gas in the second stage of the stripping process.

By various aspects of this invention, one or more of the following, or other, objects can be obtained.

It is an object of this invention to provide a process for more efficient utilization of gaseous streams.

It is a further object of this invention to provide a process for the production of high energy cutting fuel from a butenes and/or pentenes containing feed stream.

It is a further object of this invention to provide a process for producing a high energy fuel using a solvent wherein a high water concentration is maintained in the solvent system.

It is a further object of this invention to provide an improved method for selective separation of butadienes from acetylenes wherein high quality fuel is produced.

It is a further object of this invention to produce a high quality fuel.

It is a further object of this invention to provide an improved operation for stripping butadiene from an absorbent containing the same and alkyl acetylenes.

Other aspects, objects, and the several advantages of this invention are apparent to one skilled in the art from a study of this disclosure, the drawings and the appended claims.

According to the invention, there is provided a separation process wherein diolefins and alkyl acetylenes are separated from a gaseous stream containing same. In the process of this invention, a feed stream from a dehydrogenation process or the like containing acetylenes and diolefins as well as olefins and paraffinic hydrocarbons is passed to an absorption zone wherein a solvent selectively removes the diolefins and the acetylenic hydrocarbons from the mixture. The rich absorbent containing the acetylenes and the diolefins is passed to a stripping zone wherein diolefin is removed as a gaseous product, a stream containing alkyl acetylenes is removed, and lean solvent is removed as the product of the stripping zone. Further, according to the invention, a portion of the lean solvent is introduced into the stripping zone at a point above the point of entry of the rich solvent.

In one embodiment of the invention, two stripping columns are used to remove absorbed gases from the rich solvent, the lean solvent is added to the first column above the point of entry of the rich solvent. In this embodiment, diolefins are removed as a gaseous overhead product from the first column and the high energy fuel is removed as a gaseous overhead from the second column.

In another embodiment of the invention, a stripping gas which has high flame temperature is used to strip the acetylenes from the solvent, thereby increasing the flame temperature of the acetylenes containing stream as well as providing a stripping medium for the column.

Figure 2:
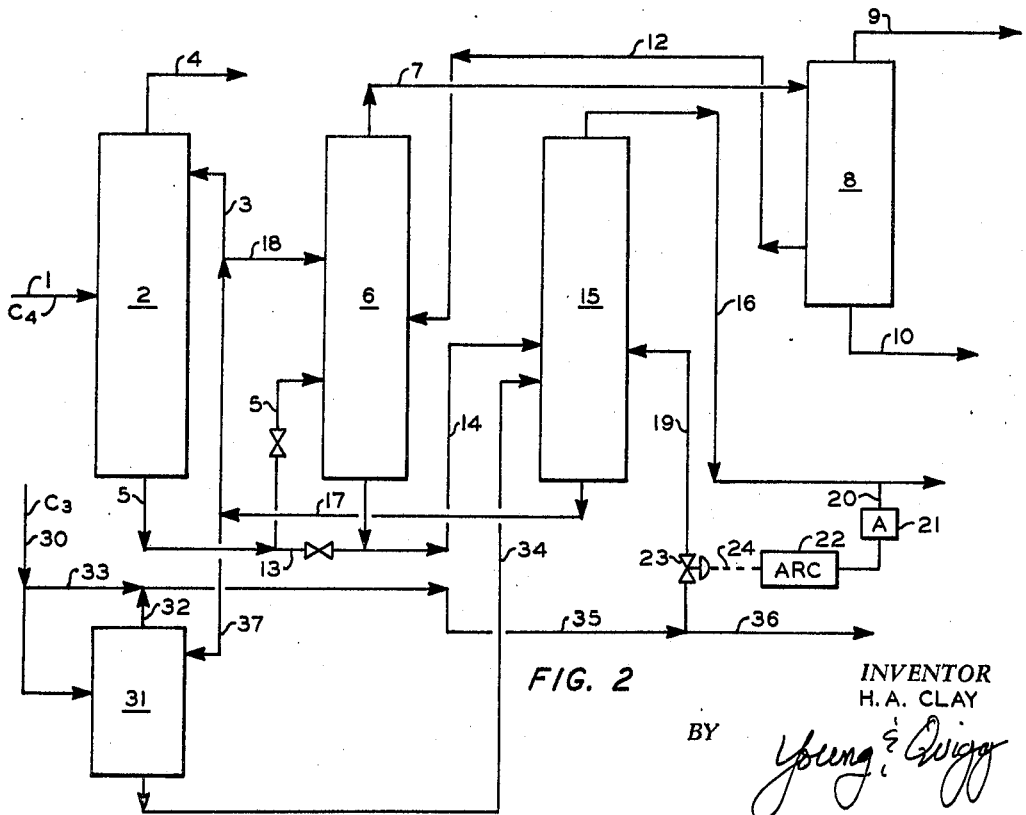
Figure 4:
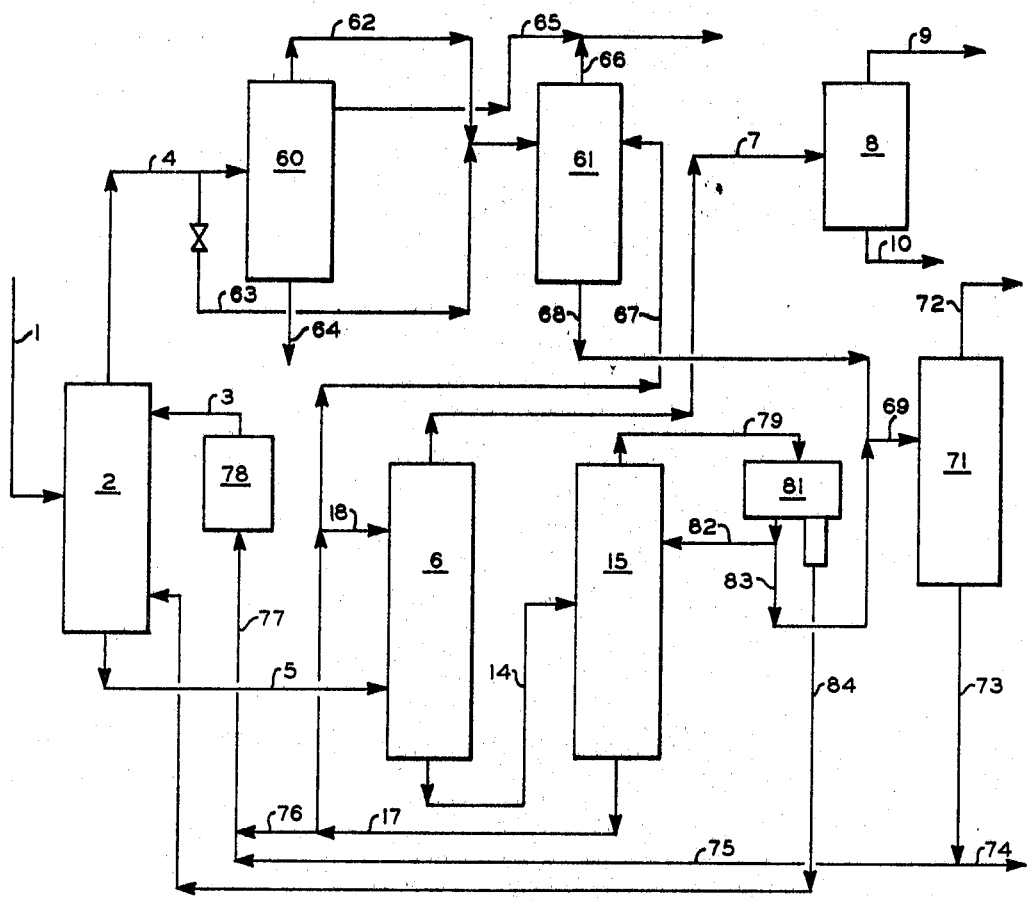
Figure 3:
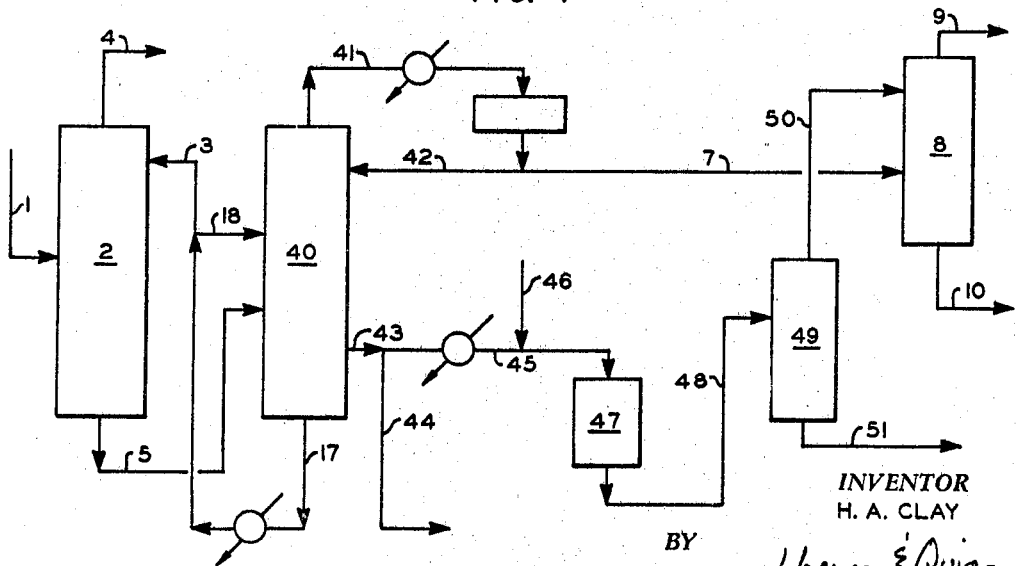

The invention can be further described with reference to the accompanying drawing in which FIGURE 1 is a schematic drawing showing recovery of a high energy fuel stream using a two stage stripping operation for a rich solvent wherein lean solvent is added to the first stripping zone; FIGURE 2 shows an embodiment of the invention wherein a second gaseous hydrocarbon stream is subjected to extractive distillation and the overhead therefrom is used at least in part as a stripping gas in the stripping operation; FIGURE 3 shows another embodiment of the invention wherein a single vessel acts as the stripping zone and the high energy fuel is removed as a side draw therefrom; and FIGURE 4 shows another embodiment of the invention in which a lean solvent containing oil is used in conjunction with a lean solvent nearly devoid of oil to produce the high energy fuel.

Referring now to FIGURE 1, which will be described in relation to a process in which butadiene is separated from alkyl acetylenes, the two products coming from a butenes-containing stream, a feed stream containing butenes, diolefins and alkyl acetylenes, passes through line 1 into extractive distillation column 2 wherein the gaseous stream is contacted with a selective solvent, for example furfural, entering column 2 through line 3. Overhead product including butene-1, butene-2, isobutylene, isobutane, and n-butane is removed through line 4. Rich solvent containing diolefins and alkyl acetylenes is removed from column 2 through line 5 and is passed to stripping column 6 wherein the rich solvent is at least partially stripped to remove diolefins which pass through line 7 to fractional distillation column 8 wherein a relatively pure diolefin stream, such as butadiene, is removed through line 9 and other products such as butene-2 are removed through line 10. A side draw can be removed from column 8 and passed through line 12 to column 6 so as to return vinyl acetylene for its ultimate recovery.

The partially stripped solvent containing vinyl acetylene is removed from column 6 through line 14 and passed to stripper 15 wherein the alkyl acetylenes are removed and pass through line 16 as an overhead product. Lean solvent is removed from stripper 15 through line 17 and in part recycled to extractive distillation column 2 as the solvent therefor. According to the invention, a portion of the lean solvent is also introduced through line 18 into stripper 6 above the point of entry of the rich solvent. By feeding the lean solvent to stripping vessel 6, a substantially more pure overhead stream 7 is recovered. This introduction of lean solvent through line 18 also results in an increase in diolefin concentration in line 14 and thus an increase in the diolefin concentration of overhead 16. The increase in diolefin concentration in line 16 increases the maximum flame temperature of the stream.

In a preferred embodiment of the invention, a stripping gas is introduced through line 19. The stripping gas will be such that it will assist the stripping of the alkyl acetylenes from the solvent and will add calorific value to the product stream 16. Thus, the stripping gas can be, for example, neopentane, butene-1+methyl acetylene and/or propadiene, or butadiene+vinyl and/or ethyl acetylenes. In the latter instance, column 6 can be by-passed by the rich solvent through line 13.

The desired analysis of the product stream 16 can be maintained by a sampling device which either continuously or periodically measures the flame temperature of the gas in line 16 and accordingly adjusts the amount of stripping gas passed through line 19. Referring to FIGURE 1, a small stream 20 is taken from line 16 and passed to analyzer 21 wherein the flame temperature is measured. The analyzer could measure the C/H ratio or the flame temperature of the fuel which is the important property for a cutting torch fuel. If the flame temperature does not come up to a predetermined value, or in the event that it is greater than the predetermined value, a signal is sent to recorder controller 22 which relays an adjusting signal to valve 23 through line 24. If the flame temperature is too low, analyzer 21 will send a low signal to recorder controller 22 which will relay the signal to valve 23 which will be opened to allow more stripping gas to be passed through line 19 into stripper 15. If the flame temperature is too high, a signal is sent by 22 to valve 23 to close it down somewhat. The system could also be used to maintain the fuel composition constant by measuring the composition of the fuel and adding in accordance therewith a predetermined amount of a lower flame temperature fuel to bring down the flame temperature of the fuel composition. Thus, a higher or lower flame temperature fuel can be added through line 19.

It is also within the scope of the invention to blend the overhead 4 from column 2 with the gas in line 16, or to use overhead 4 as the stripping medium for stripper 15.

Whereas the invention has been described with relation to a dehydrogenated butane and/or butene stream, it is obvious that the invention can be carried out using a dehydrogenated pentane and/or pentene stream. In such a case, butadiene and alkyl acetylenes could be used as a stripping gas in stripper 15 and $C_5$ diolefins and acetylenes would be contained in the high energy fuel.

Whereas the invention has been described with reference to furfural as the solvent, it is also within the scope of the invention to use other solvents such as dimethylformamide, diethylene glycol monomethyl ether, and N-methylpyrrolidone.

As an example of how the invention is carried out, the following is a material balance based on the above schematic drawing in which a dehydrogenated butane/butene stream is processed to produce a stream containing butadiene and a stream containing alkyl acetylene.

In this example, a high recovery of high purity butadiene is desired and stream 10 is used as stripping media 19 in stripper 15. If cutting torch fuel is desired, a different composition for example containing diolefins or acetylenes stream 19 can be used to give the desired fuel composition in stream 16.

| | Stream No. | | | | | | |
| --- | --- | --- | --- | --- | --- | --- | --- |
| | 1 | 4 | 7 | 9 | 10 and 19 | 12 | 16 |
| $C_3H_6$ plus $C_3H_8$ | 0.61 | 0.61 | | | | | |
| Methylacetylene | 0.01 | 0.01 | | | | | |
| Isobutane | 0.20 | 0.20 | | | | | |
| Isobutylene | 0.19 | 0.19 | | | | | |
| Butene-1 | 57.15 | 57.11 | 0.04 | 0.04 | | | |
| 1,3-butadiene | 36.62 | 0.11 | 37.00 | 36.44 | 0.07 | 0.42 | 0.07 |
| n-Butane | 2.02 | 2.02 | | | | | |
| trans-Butene-2 | 2.81 | 1.59 | 1.67 | .03 | 1.19 | 0.45 | 1.19 |
| cis-Butene-2 | 0.35 | | 0.37 | | 0.35 | 0.02 | 0.35 |
| Vinylacetylene | 0.02 | | 0.10 | | (¹) | 0.10 | 0.02 |
| Ethylacetylene | 0.02 | | 0.02 | | 0.01 | 0.01 | 0.02 |
| Total | 100.00 | 61.84 | 39.20 | 36.51 | 1.62 | 1.00 | 1.65 |

¹ Trace.

The volume of solvent (if furfural containing some oils and water) required in stream 3 will be from 2 to 14 times the feed stream 1 volume, but usually will be about 4 times the feed.

The volume of solvent in stream 18 will be from 0.1 to 1 times the volume of stream 1, but will normally be about 0.4 of stream 1.

Referring now to FIGURE 2, there is provided a process and apparatus, in schematic form, for using the invention in connection with not only a dehydrogenated butane stream, but a dehydrogenated propane stream. The dehydrogenated propane stream is passed through line 30 to extractive distillation column 31 wherein it is contacted with lean solvent entering from line 37. If desired, a portion of the dehydrogenated propane can be taken from line 30 through line 33 and admixed with the overhead from vessel 31 in line 32 and the desired flow rate of this gas is passed to stripping vessel 15 to be used as a stripping medium therein, the remainder being removed through line 36. Further, the rich solvent from vessel 31 can be removed therefrom and passed to a separate stripping operation (not shown) or passed through line 34 to vessel 15 at a point below the introduction point of rich solvent through line 14. This integrated process results in improved efficiency in utilizing gaseous refinery streams for the production of the high energy fuel.

Referring now to FIGURE 3, vessels 6 and 15 of FIGURE 1 have been combined into vessel 40 as a combination stripping and extractive distillation zone. The rich solvent passes through line 5 into vessel 40 wherein the vapors resulting from its partial stripping are contacted with lean solvent entering through line 18. Overhead gases containing primarily butadiene are removed through line 41, cooled, condensed and a portion thereof refluxed through line 42. A portion of the condensed overhead is passed through line 7 into fractional distillation column 8 wherein substantially pure butadiene is removed through line 9 and butene-2 is removed through line 10. An acetylenes-containing gaseous stream 43 is removed as a side draw from column 40 and removed through line 44 to be used as a fuel. Or, alternatively, the acetylenes-containing stream can be passed through line 45 and selectively hydrogenated in vessel 47. Hydrogen is introduced through line 46. The hydrogenated product removed through line 48 is separated in vessel 49 and the lighter products containing butadiene pass through line 50 to extractive distillation vessel 8. High boiling products are removed through line 51. A suitable hydrogenation process is described and claimed in U.S. 3,076,858.

Referring now to FIGURE 4, which will also be described with regard to the separation of butadiene and alkyl acetylenes from a dehydrogenated, butane-containing stream, the dehydrogenated butane stream passes through line 1 into extractive distillation zone 2 and therein is contacted with an oil-rich furfural solvent, the solvent entering vessel 2 through line 3. In this instance, butene-1, methyl acetylene, propadiene, and other hydrocarbons are removed through line 4 and passed to vessel 60 wherein n-butane and butene-2 are removed as bottoms through line 64, butene-1, methyl acetylene and propadiene are removed through line 62 and passed to absorber 61 wherein it is contacted with lean solvent from line 67. Additionally, butene-1 removed overhead from absorber 61 through line 66 is combined with butene-1 removed as a side stream from fractionator 60 in line 65. Alternatively, fractionator 60 can be by-passed and the overhead in line 4 can be passed by line 63 directly to absorber 61. Bottoms from absorber 61 contain propadiene, methyl acetylene and solvent and are passed through lines 68 and 69 to stripper 71. Bottoms from absorber 2 are passed by line 5 to stripper vessel 6 and are at least partially stripped therein in the presence of lean solvent added through line 18. This lean solvent and the improved stripping-fractionation serves to greatly improve the recovery of the $C_4$ acetylenes from the butadiene, leading to nearly complete removal of acetylenes from the overhead product, line 7, and leading to elimination of all but moderate concentrations of butadiene in the hydrocarbon portion of the rich solvent stream, line 14. Bottoms from stripper 6 are passed through line 14 to stripper 15 wherein the solvent is substantially stripped of the absorbed components including a major portion of the oil. The lean, low oil content, solvent is passed through line 17 and line 67 to absorber 61, and by line 76 into admixture with oil-rich solvent from line 75 in line 77 and vessel 78, then by line 3 to absorber 2. The overhead from stripper 15, line 79, containing alkyl acetylenes, traces of furfural, oils, other hydrocarbons and some water is cooled and condensed, then passed to vessel 81 and the hydrocarbon phase thereof refluxed to stripper 15 through line 82. Vessel 81 separates hydrocarbon from water, the latter being removed through line 84 and passed thereby to the lower portion of absorber 2 as solvent-modifying water thereto. This water in absorber 2 reduces the temperature required in the reboilers of absorber 2 and stripping column 6, thereby also reducing thermal degradation of the solvent. The introduction of water by this system eliminates the need for the addition of water to surge vessel 78. An excess of water in surge vessel 78 would cause the formation of two liquid phases which would in turn cause problems in feeding a consistent solvent mixture to absorber 2. The alkyl acetylene-containing hydrocarbon phase in vessel 81 is refluxed as desired to column 15 by line 82, the remaining portion being removed by lines 83 and 69 as a combined feed of alkyl acetylenes and solvent and passed to stripper 71, from which high energy fuel is removed by line 72. In this instance, the high energy fuel contains butadiene, methyl, ethyl and vinyl acetylenes. Solvent, containing oils, is removed from stripper 71 through line 73 and can be removed through line 74 for purification of the furfural solvent before reuse or can be recycled through lines 75, 77, vessel 78 and line 3 to the rich-oil absorber 2, to provide the desired concentration of oils to modify the solvent abilities of the furfural plus water in absorber 2 to cause rejection of methyl acetylene and propadiene into stream 4 while butadiene and $C_4$ acetylenes into stream 5.

This use of absorber 2, employing solvent high in oil concentration in combination with absorber 61 employing solvent low in oil concentration allows for a more complete separation of methyl acetylene and propadiene from principal product butadiene, lines 7 and 9. With the use of the low oil solvent only in absorber 2, there would be a higher concentration of propadiene and/or methyl acetylene in line 7 from stripper column 6. In this embodiment of the invention, the oils as well as butadiene and $C_4$ acetylenes are stripped from the solvent in column 15, and this oil-containing overhead product in line 83 is combined with the methyl acetylene-containing solvent from absorber 61, line 68, before the final stripping operation in column 71 to recombine all of the high energy fuel components for maximum recovery thereof (line 72) as well as producing butadiene product in line 9 of extremely low alkyl acetylenes concentration. As before, column 8 serves to fractionate butadiene product, line 9, from butenes-2, removed by line 10, to achieve the desired purity of butadiene in which the alkyl acetylenes concentration is extremely low.

As used throughout the specification, high energy fuel refers especially to a fuel which is suitable for a cutting fuel. The fuel would have a high flame temperature.

Reasonable variation and modification are possible within the scope of the foregoing disclosure, the drawings and the appended claims to the invention, the essence of which is that in the separation of alkyl acetylenes and diolefins from a dehydrogenated stream, using an absorber and a stripper, lean solvent is fed into the stripper above the point of entry of rich solvent and to the absorber column.

I claim:
1. A method for producing a high energy fuel containing alkyl acetylenes comprising:
   (a) passing a dehydrogenated stream of hydrocarbons to a solvent extraction zone,
   (b) introducing into said solvent extraction zone a solvent which preferentially extracts alkyl acetylenes and diolefins from other components of said hydrocarbon stream,

(c) removing nonabsorbed hydrocarbon from said extraction zone, (d) removing rich solvent containing alkyl acetylenes and diolefins from said extraction zone, (e) passing said rich solvent to a first stripping zone and therein at least partially stripping same in the presence of a lean solvent, the lean solvent being introduced into said first stripping zone at a point above the point at which rich solvent is introduced thereto, (f) removing a stream containing substantial quantities of diolefin from the overhead from said first stripping zone, (g) removing partially stripped solvent from said first stripping zone and passing said solvent to said second stripping zone wherein absorbed gaseous products are substantially completely stripped from said solvent, (h) removing an alkyl acetylene containing stream as a gaseous product from said second stripping zone;

(i) passing a stripping gas containing a combustible hydrocarbon to the lower portion of at least one of said first and said second stripping zones, and (j) removing a lean solvent containing stream from said second stripping zone and using the stream as the solvent in said first stripping zone and in said absorption zone.

2. A method according to claim 1 wherein a stripping gas having a fixed flame temperature is used in said second stripping zone, the flame temperature of the gaseous alkyl acetylene containing stream is measured, and the amount of stripping gas supplied to said second stripper is adjusted in accordance with a predetermined flame temperature for said alkyl acetylene containing stream.

3. A method according to claim 1 wherein a second dehydrogenated stream is passed to a second solvent extraction zone, wherein it is contacted with lean solvent from said stripping zone, and the overhead gaseous stream from said second solvent extraction zone is passed to a bottom portion of said stripping zone and used therein as a stripping agent.

4. A method according to claim 1 wherein said dehydrogenated hydrocarbon stream is a dehydrogenated pentane stream, and a stripping gas comprising butadiene and vinyl acetylene is added to said stripping vessel to aid in the stripping operation therein and to improve the heat content of said acetylenes-containing fuel stream.

5. A method according to claim 1 wherein said dehydrogenated hydrocarbon stream is a dehydrogenated butane stream, wherein butadiene is removed as substantially pure stream from said first stripping zone, and wherein said high energy acetylenes-containing fuel is removed as an overhead gaseous stream from said second stripping zone.

6. A method according to claim 1 wherein a stripping gas comprising butene-1 and methyl acetylene is introduced to the lower portion of said second stripping zone.

7. A method according to claim 1 wherein a stripping gas comprising neopentane is introduced as a stripping gas into said second stripping zone.

8. A method according to claim 1 wherein an oil rich solvent is used in said extractive distillation zone, the overhead from said extractive distillation zone is contacted with a lean solvent in a second extractive distillation zone, the rich solvent from said second extractive distillation zone is combined with the overhead from said second stripping zone, the combined overhead from said second stripping zone and said rich solvent from said second extractive distillation zone are passed to a third stripping zone wherein high energy fuel is removed as an overhead vaporous product and an oil rich solvent is removed as the bottoms from said third stripping zone, said oil rich solvent is recycled to said first extractive distillation zone, and the bottoms from said second stripping zone containing lean solvent is passed to said first stripping zone and to said second extractive distillation zone.

9. A method according to claim 1 wherein excess water is maintained in the system, wherein the overhead from said second stripping zone, containing water, is passed to a separation zone wherein hydrocarbon is separated from water, and the water is recycled to said extractive distillation zone.

10. A method according to claim 1 wherein said selective solvent is dimethylformamide, said diolefin is butadiene, and butadiene is introduced into at least one of said stripping zones as a stripping gas.

11. A method according to claim 1 wherein a portion of said alkyl acetylene containing stream removed from at least one of said stripping zones is passed to a selective hydrogenation zone and therein in the presence of a catalyst selectively hydrogenated, passing the effluent from said hydrogenation zone to a separation zone, removing diolefins from said separation zone, and combining said diolefins with said substantially pure diolefin containing stream from at least one of said stripping zones.

12. A high energy fuel produced according to the process of claim 1.

13. A method for the production of a high energy fuel and a substantially pure butadiene containing stream from a dehydrogenated butane stream and a dehydrogenated propane stream, said method comprising passing said dehydrogenated butane stream to a first extractive distillation zone, therein contacting said dehydrogenated butane stream with a selective solvent which selectively absorbs butadiene and alkyl acetylenes, removing non-absorbed gases as an overhead from said first extractive distillation zone, removing butadiene as a side draw column from a stripping portion of said extractive distillation zone, removing rich solvent from said extractive distillation zone and passing the same to a stripping zone, passing said dehydrogenated propane stream to a second extractive distillation zone, therein contacting said dehydrogenated propane stream with a lean solvent stream from said stripping zone, removing non-absorbed gases as overhead vapor from said second extractive distillation zone, passing said non-absorbed overhead vapors from said second extractive distillation zone to the bottom portion of said stripping zone as a stripping medium in said stripping zone, and removing an alkyl acetylene containing stream as a gaseous overhead from said stripping zone.

References Cited

UNITED STATES PATENTS

| | | | |
|---|---|---|---|
| 2,356,986 | 8/1944 | Frey | 260—681.5 XR |
| 2,371,817 | 3/1945 | Frey | 260—681.5 |
| 2,396,300 | 3/1946 | Cummings et al. | 260—681.5 |
| 2,395,362 | 2/1946 | Welling. | |
| 2,925,452 | 2/1960 | Broughton | 260—681.5 |

FOREIGN PATENTS

| | | |
|---|---|---|
| 572,997 | 11/1945 | England. |
| 1,184,334 | 12/1964 | Germany. |

MORRIS O. WOLK, Primary Examiner

J. D. OLSEN, Assistant Examiner

U.S. Cl. X.R.

260—681.5